United States Patent Office 3,519,080
Patented July 7, 1970

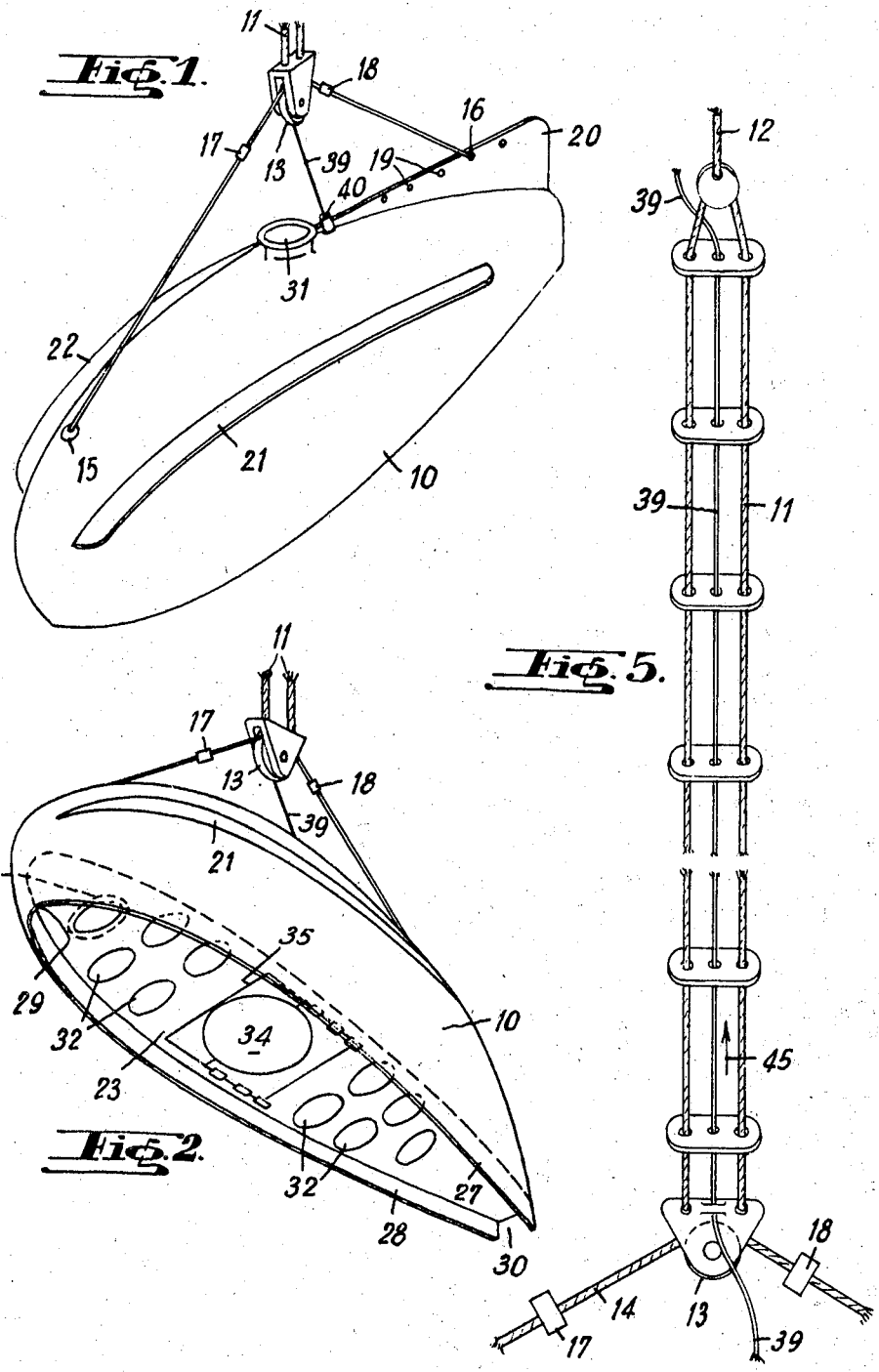

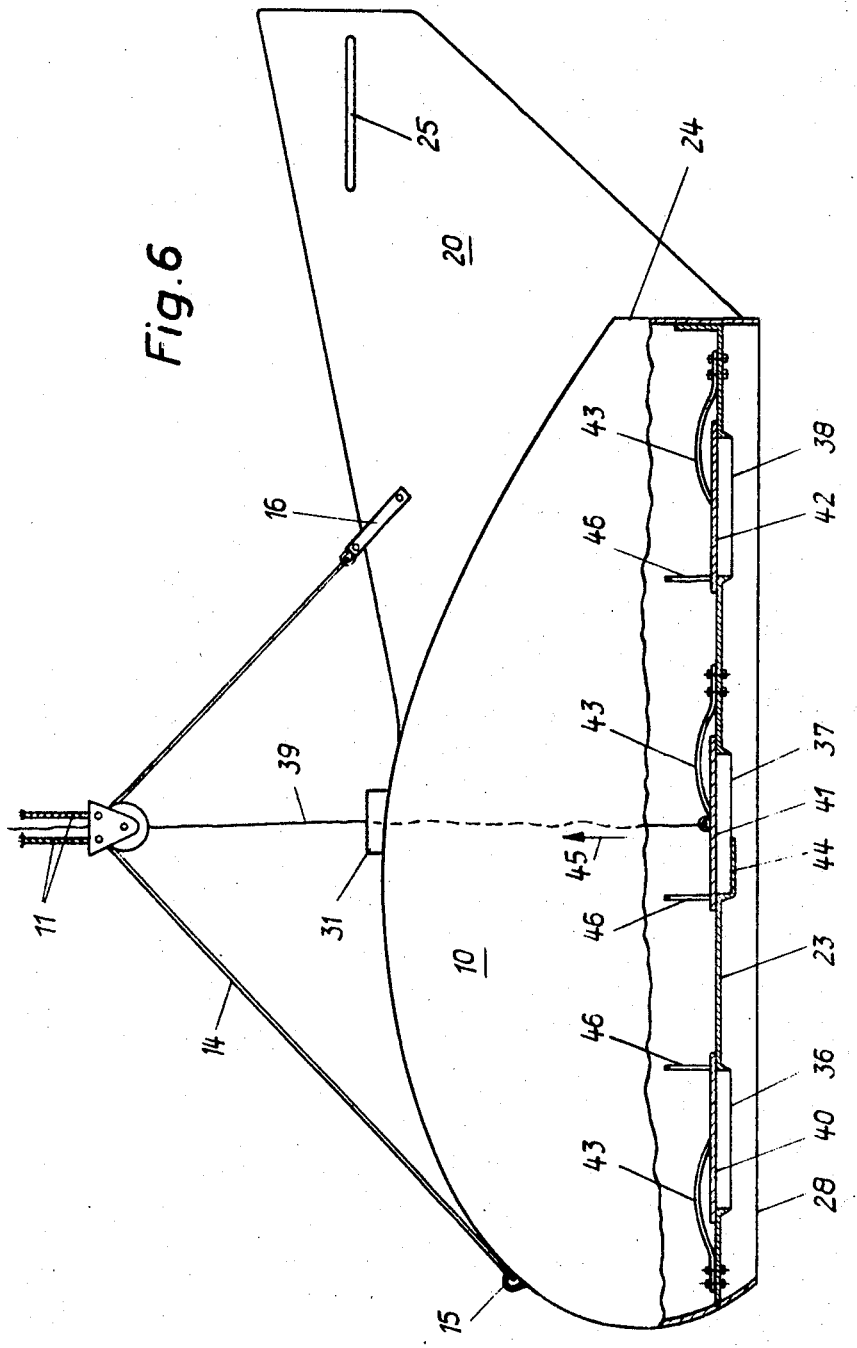

3,519,080
EQUIPMENT FOR THE AERIAL TRANSPORT OF LIQUIDS, PARTUCULARLY FOR FIGHTING FIRES
Frédéric Rochat, Geneva, Switzerland, assignor to Sicli Materiel Incendis S.A., Carouge, Geneva, Switzerland
Filed July 16, 1968, Ser. No. 745,173
Claims priority, application Switzerland, Aug. 10, 1967, 11,279/67
Int. Cl. A62c 3/02
U.S. Cl. 169—2  9 Claims

ABSTRACT OF THE DISCLOSURE

The invention relates to an equipment for the aerial transport of liquids, particularly for fighting fires. This equipment comprises a flying machine, advantageously a helicopter, to which a tank having an aerodynamic shape is suspended. This tank is able to be rapidly filled by its immersion in a body of water. Once filled, it is transported by means of the flying machine above an area of a fire where the water contained in the tank is discharged upon the fire to be extinguished.

BACKGROUND OF THE INVENTION

It frequently happens that fires break out in places which are difficult of access and far from water points. This is particularly the case for forest fires. In these circumstances fire-fighting by the means used up to now is not very effective, and fires cause considerable destructions. It is therefore of the utmost importance to have the possibility of sprinkling large quantities of water on certain areas. The present invention aims at achieving this purpose.

SUMMARY OF THE INVENTION

The invention concerns an equipment for the aerial transport of liquids, in particular in view of fighting fires. This equipment comprises a flying machine and at least one tank having an aerodynamic shape; this tank carries at least one horizontal aileron and is provided with a fin in its vertical plane of symmetry; its bottom is provided with at least one filing opening for rapidly filling by immersion; further means are provided to suspend this tank from the flying machine and to control the emptying opening of the tank from the flying machine.

This latter can be advantageously a helicopter.

The equipment allows the transportation of water, but it can also serve to transport other liquids, to be used for purposes other than fire-fighting, for instance for the treatment of cultivated surfaces (vineyards, fields, forests).

The filling opening of the tank may also be used to empty the latter. It is however advantageous for the tank to be provided with several filling openings in order to be able to achieve a very rapid filling operation. Emptying can be effected through a single opening, which may be a filling opening or an opening only to be used for emptying the tank.

BRIEF DESCRIPTION OF THE DRAWINGS

The subject matter of the invention is particularly pointed out and distinctly claimed in the concluding portion of this specification. The invention, both as regards its organisation and operation, may best be understood by reference to the following description in connection with the accompanying drawings in which only the tank suspended to the flying machine is represented.

FIG. 1 is a perspective view of a first embodiment of the tank seen from above.

FIG. 2 is also a perspective view of the tank according to FIG. 1, but seen from below.

FIG. 5 shows the means for suspending the tank from the flying machine.

FIG. 6 is a partly sectional elevation of the tank according to FIGS. 3 and 4.

DESCRIPTION OF THE TWO ILLUSTRATED EMBODIMENTS

Figure 3:
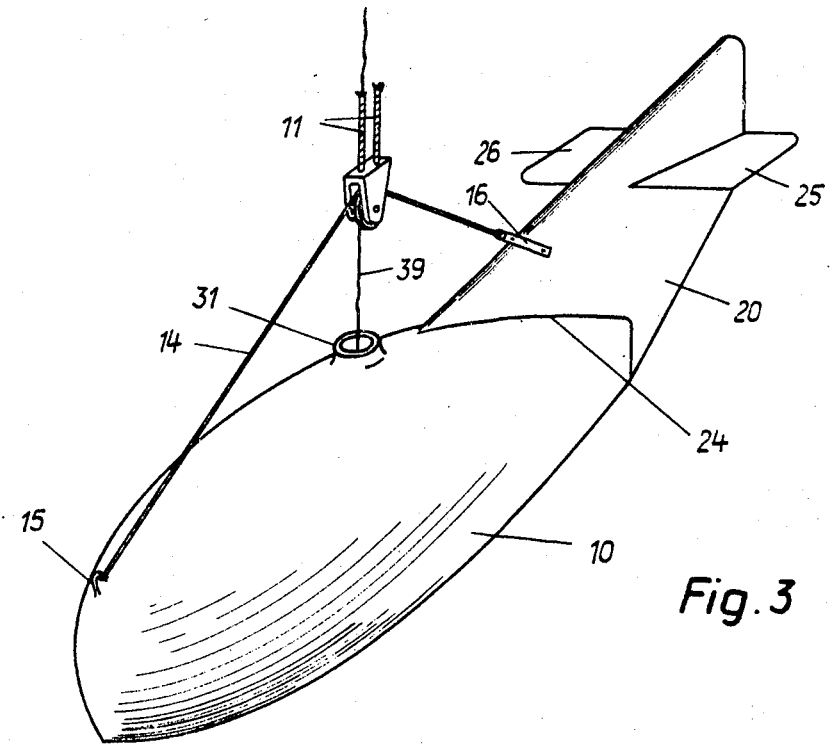
FIG. 3 is a perspective view of a second embodiment of the tank seen from above.

Referring to the drawings, a tank 10 of aerodynamic shape (FIGS. 1, 2, 3, 4 and 6) is destined to be suspended from a flying machine, which is not shown. The latter is preferably a helicopter. The connection between the tank 10 and the flying machine comprises a sling 11 (FIG. 5) formed by two metallic cables, secured at its upper end 12 to the flying machine, for instance to the cargo sling. This sling 11 carries a roller 13 at its lower end; a strop 14 secured to the tank 10 in 15 and in 16 passes round the roller 13. This latter can move either towards the point 15 or towards the point 16, this displacement being however limited by two adjustable stops 17 and 18. In the embodiment of FIGS. 1 and 2, the securing point 16 is adjustable thanks to the holes 19 provided in the fin 20 of the tank 10. This fin is situated in the vertical plane of symmetry of the tank 10, the shape of which, as already indicated, is aerodynamic.

In the embodiment of FIGS. 1 and 2, the tank 10 is provided with two lateral ailerons 21 and 22. Each of these ailerons runs along the major part of the length of one of the sides of the hull of the tank. These ailerons are dimensioned in such a way and are of such a shape that they can exercise a negative lift when the tank is empty and moves horizontally at a speed of the order of 150 to 250 km. per hour.

The tank 10 comprises a bottom 23. The hull of the tank 10 projects below the bottom 23 (see FIGS. 2 and 4) and thus forms vertical flanks 27 and 28 extending on either side of the vertical plane of symmetry of the tank. These flanks 27 and 28 meet in 29 at their forward end part, whilst a space 30 (FIG. 2) is left between them at their rear end part. A hollow space is thus formed below the bottom 23 of the tank 10.

The hull of the tank 10, as well as the ailerons 21 and 22 and the fin 20 may be formed by two half hulls of moulded plastic material, welded together. The bottom 23 of the tank may be made of metal. A filling opening 31 for filling by means of a hose is provided in the upper part of the tank 10; this opening also serves to vacuate the air from the tank when the latter is filled by immersion from below. as will be described later.

Opening 32 are provided in the bottom of the tank. These openings are each closed by a non-return valve 33 (see FIG. 2); they serve for filling the tank rapidly by immersion.

The bottom of the tank is pierced by an emptying opening 34, closed by a trap-door 35.

This trap-door 35 is controlled from the flying machine by means of a cable 39 sliding freely between the cables of the sling 11 (see FIG. 5). This cable 39, the upper end of which is situated within easy reach in the flying machine, enters the tank 10 and its lower end is connected to the trap-door 35.

Figure 4:
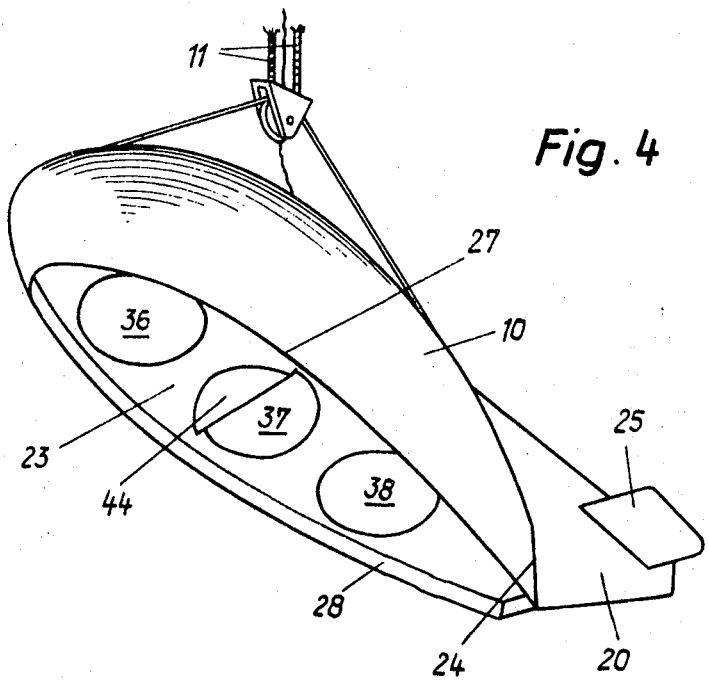
FIG. 4 is also a perspective view of the tank according to FIG. 3, but seen from below.

In the second and prefered embodiment of the tank 10, illustrated in FIGS. 3, 4 and 6, the fin 20 extends beyond and above the stern 24 of the hull of the tank. This fin carries two horizontal ailerons 25 and 26; the position of these latter may be adjusted in the workshop. This tank is provided, like that according to FIGS. 1 and 2, with a bottom 23 and with vertical flanks 27 and 28; although it is not provided with longitudinal ailerons running along its hull, such ailerons could be provided. It is carried by the flying machine by means of a sling 11 and a strop 14 secured in 15 and 16.

Three openings 36, 37 and 38 are provided in the bottom 23. Each of these openings is closed by a flap 40, 41 and respectively 42 (FIG. 6); each of these flaps is applied against its respective opening by a resilient strip 43 (spring steel) rivetted to the bottom 23 and carrying its respective flap at its free end. The force exerted by the strips 43 on the flaps is not sufficient to prevent them from being lifted by the hydrostatic pressure acting on them when the tank 10 is set down on a sheet of water. The displacement of the flaps towards the interior of the tank is limited by arches 46.

The flap 41 which closes the central opening 37 is controlled by the cable 39 already described with reference to FIG. 5. The central opening 37 thus serves to fill as well as to empty the tank 10, whilst the openings 36 and 38 only serve for the filling operation. A deflector 44 masks part of the opening 37; it serves to scatter the water flowing from this opening when the tank is being emptied.

The operation of the equipment for transporting liquid, two embodiments of which have just been described, is as follows:

The tank 10 being empty and suspended from the flying machine (preferably a helicopter), it is required to fill it with liquid, in particular with water. The filling openings 32 (FIG. 2) and 36, 37 and 38 (FIGS. 4 and 6) are closed by their respective valves 33 and 40, 41, 42; the emptying opening 34 (FIG. 2) is also closed. Two methods of filling the tank are possible: the one through the opening 31 by means of a hose, the tank resting on the ground, and the other by immersion of the tank in a body of water (pond, lake, sea).

It will be remarked that when the tank is resting on the ground, it rests on the edge of the flanks 27 and 29 and a free space is present beneath the bottom 23, which prevents, even in the case of uneven ground, the asperities of the ground from opening the valves 33 (FIG. 2) and respectively 40, 41, 42 (FIGS. 4 and 6, and blocking them in the open position or from damaging the bottom 23.

When the tank is rapidly filled by its immersion in a body of water, the valves 33, 40, 41 and 42 open automatically as soon as the tank has begun to sink in the water and the air escapes through the opening 31. The trap-door 35 remains closed. In as far as it is possible, the immersion of the tank 10 is effected whilst the flying machine is not moving horizontally.

Once the tank is full, it is lifted by the flying machine and the valves 33, 40, 41 and 42 close automatically. The flying machine flies off toward the point where the liquid is to be discharged; it drags the tank beneath itself.

Once the point (seat of the fire) where the liquid has to be discharged is reached, the emptying opening 34 (FIG. 2) and respectively 37 (FIGS. 4 and 6) of the tank is opened by pulling on the control cable 39 in the direction of the arrows 45 (FIGS. 5 and 6).

Owing to this pull, either the trap-door 35 (FIG. 2) is opened, or the flap 41 (FIG. 6) is lifted. The openings 34 (FIG. 2) and respectively 37 (FIGS. 4 and 6) are open and the liquid escapes from the tank 10. Once the latter is empty, the pull on the cable 39 is released and the trap-door 35 (FIG. 2) or the flap 41 (FIG. 6) close again.

The flying machine returns to the point where the tank 10 was filled and the cycle of operations is begun again. Thus the equipment according to the invention allows important quantities of liquid, in particular water for extinguishing fires, to be transported very rapidly to inaccessible places.

Whilst the equipment is travelling to and fro, the fin 20 keeps the tank with its longitudinal axis pointing in the direction of flight of the flying machine, the longitudinal ailerons 21 and 22 (FIGS. 1 and 2) ensuring that a negative lift is exerted on the tank 10 when it is empty, thus preventing the same from swinging below the flying machine. This swinging is also prevented by the hollow space formed below the bottom 23 of the tank between the flanks 27 and 28. In fact, during flight with a horizontal component, a depression forms in this hollow space which contributes, together with the fin and the ailerons (disposed either on the hull or on the fin) towards the reduction of the variable incidences of flight due to differences in the load (full or empty tank) and the winds.

Here are, given by way of simple indicative example, what the dimensions of the equipment could be for a speed of flight of the flying machine (Alouette III for instance) of the order of 150 to 250 km. per hour:

Capacity of the tank: 200 to 500 litres, preferably of the order of 300 litres.

Weight of the empty 300 litre tank: 70 kg.

Dimensions of the 300 litre tank: length 180 cm., width 65 cm., height 65 cm.

Length of the sling: 10 meters.

Diameter of each of the ten openings 32 (FIG. 2) for the rapid filling by immersion: 8 cm.

Diameter of the opening 31: 10 cm.

Distance between the middle plane 24 and the lower edge of the vertical flanks 27 and 28: 5 cm.

With an equipment according to the invention having the dimensions which have just been indicated, the stability during flight is ensured by the fin 20. The ailerons 21 and 22 or 25 and 26 together with the suction produced by the empty space below the bottom 23 allow a flying speed of the order of 170 km. per hour, whether the tank 10 be empty or full. The filling of the tank by immersion can already be effected in a body of water the depth of which is only 50 cm., duration of filling 5 seconds. The total emptying of the tank can be effected in 30 seconds or less.

Although the invention has been described in its preferred forms with a certain degree of particularity, it is understood that the present disclosure has been made by way of examples and that numerous changes in the details of construction and the combination and arrangement of parts can be resorted to without departing from the spirit and the scope of the invention.

What is claimed is:

1. Equipment for the aerial transport of liquids, in particular for use in fighting fires, comprising a flying machine and at least one tank of aerodynamical shape, this tank carrying at least one horizontal aileron and being provided with a fin in its vertical plane of symmetry, and in its bottom with at least one filling opening for rapidly filling the tank by immersion, means being provided for suspending this tank from the flying machine and for controlling the emptying of the tank from the flying machine, and vertical flanks provided at the base of said tank extending on either side of the said vertical plane of symmetry, these flanks forming a hollow space below the bottom of the tank.

2. Equipment according to claim 1, in which the said fin extends beyond the stern of the hull of the tank.

3. Equipment according to claim 1, in which at least one horizontal aileron runs along each side of the hull of the tank.

4. Equipment according to claim 1, in which the said fin carries a horizontal aileron on each of its sides.

5. Equipment according to claim 1, in which at least one horizontal aileron runs along each side of the hull of the tank and extends along the greater part of the length of said hull.

6. Equipment according to claim 1, in which the opening for rapid filling is closed by a retaining flap.

7. Equipment according to claim 1, in which a retaining flap closes the opening for rapid filling of the tank, said retaining flap being connected to the means for controlling the emptying of the tank, the said filling opening also acting as emptying opening.

8. Equipment according to claim 1, in which the said tank is provided in its upper part with an opening for the escape of the air when it is being filled by immersion or for its filling with liquid.

9. Equipment according to claim 1, in which the said tank has a capacity of from 200 to 600 litres.

References Cited

UNITED STATES PATENTS

| | | | |
|---|---|---|---|
| 1,396,894 | 11/1921 | Stevens | 244—136 |
| 3,248,074 | 4/1966 | Cannon | 244—137 |
| 3,423,053 | 1/1969 | Hawkshaw | 244—136 |
| 3,442,334 | 5/1969 | Gousetis | 169—2 |

LLOYD L. KING, Primary Examiner

J. J. LOVE, Assistant Examiner

U.S. Cl. X.R.

169—1; 239—171